(12) United States Patent
Raut et al.

(10) Patent No.: US 8,117,487 B1
(45) Date of Patent: Feb. 14, 2012

(54) METHOD AND APPARATUS FOR PROACTIVELY MONITORING APPLICATION HEALTH DATA TO ACHIEVE WORKLOAD MANAGEMENT AND HIGH AVAILABILITY

(75) Inventors: Yojana Narharrao Raut, Pune (IN); Rakesh Kumar Agrawal, Pune (IN); Mehendra Dilip Karmuse, Pune (IN)

(73) Assignee: Symantec Corporation, Mountain View, CA (US)

( * ) Notice: Subject to any disclaimer, the term of this patent is extended or adjusted under 35 U.S.C. 154(b) by 283 days.

(21) Appl. No.: 12/345,202

(22) Filed: Dec. 29, 2008

(51) Int. Cl.
*G06F 11/00* (2006.01)
(52) U.S. Cl. ........................ 714/4.11; 709/224
(58) Field of Classification Search .................. 714/3
See application file for complete search history.

(56) References Cited

U.S. PATENT DOCUMENTS

| | | | |
|---|---|---|---|
| 7,353,265 B2* | 4/2008 | Gopalkrishnan et al. | 709/223 |
| 7,596,720 B2* | 9/2009 | Curtis et al. | 714/38 |
| 7,680,918 B2* | 3/2010 | Gopalkrishnan et al. | 709/223 |
| 7,831,412 B1* | 11/2010 | Sobel et al. | 702/186 |
| 2004/0088403 A1* | 5/2004 | Aggarwal | 709/224 |
| 2006/0031478 A1* | 2/2006 | Gopalkrishnan et al. | 709/224 |
| 2006/0048017 A1* | 3/2006 | Anerousis et al. | 714/47 |
| 2006/0168199 A1* | 7/2006 | Chagoly et al. | 709/224 |
| 2007/0180314 A1* | 8/2007 | Kawashima et al. | 714/15 |
| 2008/0114878 A1* | 5/2008 | Gopalkrishnan et al. | 709/224 |
| 2008/0235075 A1* | 9/2008 | Couture et al. | 705/10 |
| 2009/0024868 A1* | 1/2009 | Joshi et al. | 714/4 |
| 2009/0070457 A1* | 3/2009 | McKinney | 709/224 |
| 2009/0199051 A1* | 8/2009 | Jann et al. | 714/57 |

OTHER PUBLICATIONS

"VMware High Availability," Product Datasheet, Copyright 2009 VMware, Inc. Downloaded from web site http://www.vmware.com/files/pdf/ha_datasheet.pdf on May 6, 2009.
"Proactive Monitoring and Alerting Maximizes Uptime and Availability," Product Datasheet: Sybase Monitoring Solution, Copyright 2005 Sybase, Inc. Downloaded from web site http://www.bradmark.com/site/products/pdfs/sybase/Surveillance_overview.pdf on May 6, 2009.
"Proactive Monitoring," MyStream, International High Availability IP Virtual Network Operator. Downloaded from web site http://www.mystream.eu/supervision-WAN-backup-mystream-proactive-monitoring.html on May 6, 2009.
Thome, Bob, "The High Availability Database Server Cookbook," Deploying, Managing, and Administering the Oracle Internet Platform, Paper 273. Downloaded from web site http://www.oracle.com/technology/deploy/availability/pdf/oow_273_ha_db_server_cookbook.pdf on May 6, 2009.
Cragle, Jonathan, "ClusterX 2.0," from the Dec. 1999 Edition of Windows IT Pro. Downloaded from web site http://windowsitpro.com/article/articleid/7605/clusterx-20.html on May 6, 2009.

(Continued)

*Primary Examiner* — Scott Baderman
*Assistant Examiner* — Kamini Patel
(74) *Attorney, Agent, or Firm* — Wilmer Cutler Pickering Hale and Dorr LLP

(57) ABSTRACT

A method and apparatus for proactively monitoring data center health data to achieve workload management and high availability is provided. In one embodiment, a method for processing application health data to improve application performance within a cluster includes accessing at least one of performance data or event information associated with at least one application to determine application health data and examining the application health data to identify an application of the at least one application to migrate.

13 Claims, 6 Drawing Sheets

OTHER PUBLICATIONS

"Cluster Continuous Replication," Microsoft TechNet, Copyright 2009 Microsoft Corporation. Downloaded from web site http://technet.microsoft.com/en-us/library/bb124521.aspx on May 6, 2009.

* cited by examiner

US 8,117,487 B1

METHOD AND APPARATUS FOR PROACTIVELY MONITORING APPLICATION HEALTH DATA TO ACHIEVE WORKLOAD MANAGEMENT AND HIGH AVAILABILITY

BACKGROUND

1. Field of the Invention

Embodiments of the present invention generally relate to cluster management and, more particularly, to a method and apparatus for proactively monitoring application health data to achieve workload management and high availability.

2. Description of the Related Art

A computing environment may include a computer cluster (e.g., a plurality of client computers coupled to a server computer or a plurality of server computers (i.e., a peer-to-peer)) that hosts multiple applications. The applications generally depend on system resources, such as software resources (e.g., operating system (OS), device drivers and/or the like), hardware resources (e.g., storage resources, processors and/or the like) and thus provide services to the client computers. In addition, the system resources are shared dynamically across the various applications in the computing environment. In operation, dependencies on the system resources may introduce a failure, which affects application performance within the cluster. For example, on occurrence of a failure and/or non-availability of computer resources, the particular application may become non-responsive and/or terminate.

Generally, a system administrator of the computing environment desires that the applications run continuously and/or uninterruptedly. For example, the system administrator monitors a status of the particular application using clustering software and/or health monitoring software. However, the status does not indicate application health of the particular application. Hence, the clustering software and/or the health monitoring software are not cluster-aware and cannot provide corrective measures that leverage a clustering infrastructure to ensure that the particular application is performing optimally.

Currently, the clustering software and/or the health monitoring software do not ascertain a cause of the failures in the clustering environment. If a failure did occur, the clustering software employs a single static (i.e., pre-defined) priority list of nodes to which a particular application can failover. However, such a static list does not account for a cause of the failure. As such, the static priority list may indicate a target node that is also affected by the failure and therefore, not suitable for operating the particular application. For example, the static priority list may indicate that the particular application is to failover to a Node 1, a Node 2 or a Node 3 in the stated order. Furthermore, the Node 1 and the Node 2 share a router of which the Node 3 does not use. If the particular application is operating on the Node 1 as the router fails, the particular application will failover to the Node 2 even the failure most likely affects Node 2 as well as Node 1 but does not affect the Node 3. As such, Node 3 is a better choice but is not selected because the static priority list does not account for the cause of the failure.

Accordingly, there is a need in the art for a method and apparatus for proactively monitoring application health data to achieve workload management and high availability.

SUMMARY OF THE INVENTION

Embodiments of the present invention comprise a method and apparatus for proactively monitoring application health data to achieve workload management and high availability. In one embodiment, a method for processing application health data to improve application performance within a cluster includes accessing at least one of performance data or event information associated with at least one application to determine application health data and examining the application health data to identify an application of the at least one application to migrate.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
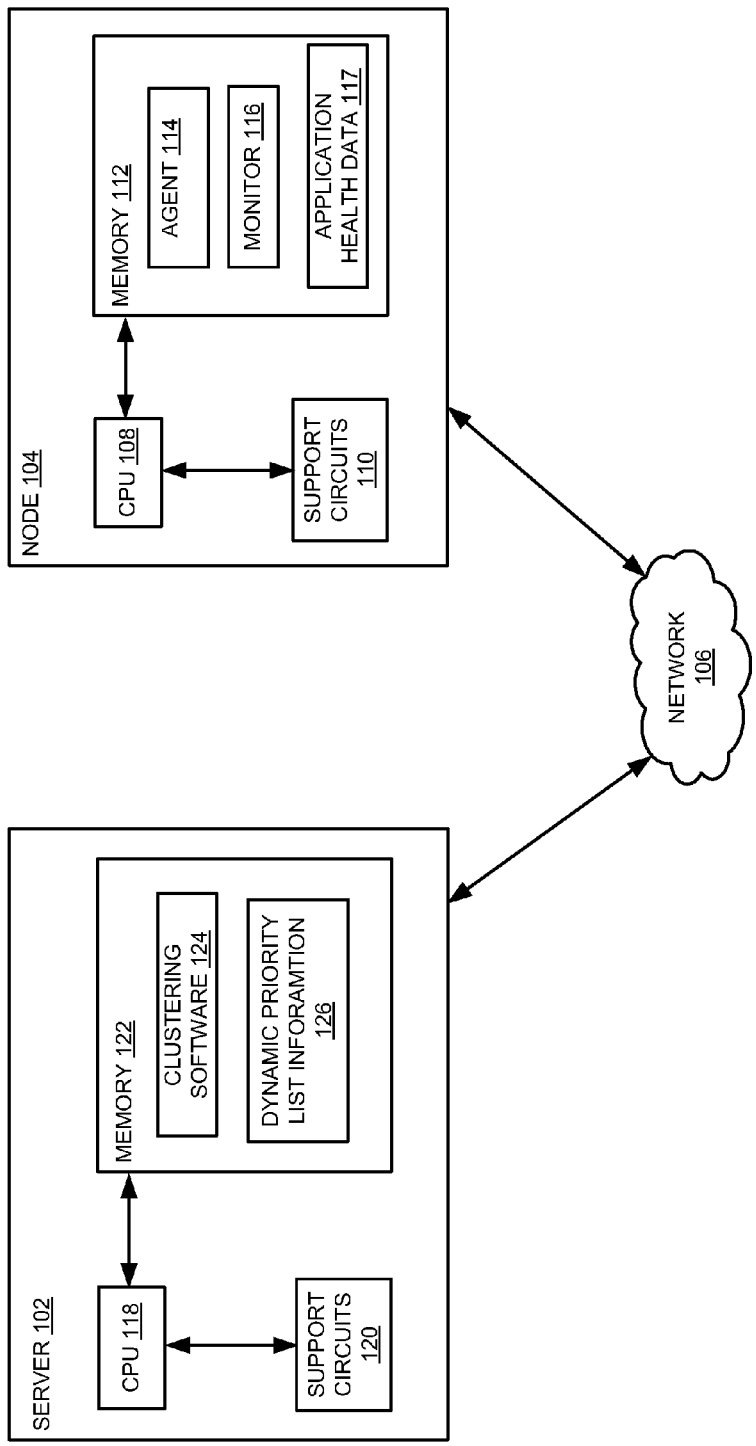
FIG. 1 is a block diagram of a system for proactively monitoring application health data to achieve workload management and high availability according to one or more embodiments.

FIG. 1 is a block diagram of a system 100 for proactively monitoring application health data to achieve workload management and high availability according to various embodiments. The system 100 comprises a server 102 and a node 104 where each is coupled to each other through a network 106. It is appreciated that the system 100 comprises a plurality of nodes that provides application services to one or more client computers. Alternatively, the system 100 may include a peer-to-peer cluster.

The server 102 is a type of computing device (e.g., a laptop, a desktop, a Personal Digital Assistant (PDA) and/or the like), such as those generally known in the art. The server 102 includes a Central Processing Unit (CPU) 118, various support circuits 120 and a memory 122. The CPU 118 may comprise one or more commercially available microprocessors or microcontrollers that facilitate data processing and storage. The various support circuits 120 facilitate the operation of the CPU 118 and include one or more clock circuits, power supplies, cache, input/output circuits, and the like. The memory 122 comprises at least one of Read Only Memory (ROM), Random Access Memory (RAM), disk drive storage, optical storage, removable storage and/or the like. The memory 122 includes various software packages, such as clustering software 124. The clustering software 124 may be high availability clustering server software. Furthermore, the memory includes various data, such as dynamic priority list information 126.

The node 104 are one or more types of computing devices (e.g., a laptop, a desktop, a Personal Digital Assistant (PDA) and/or the like), such as those generally known in the art. Generally, the node 104 includes various computing resources, such as application resources, replication resources database resources, network resources, storage resources and/or the like. The node 104 includes a Central Processing Unit (CPU) 108, various support circuits 110 and a memory 112. The CPU 108 may comprise one or more commercially available microprocessors or microcontrollers that facilitate data processing and storage. The various support circuits 110 facilitate the operation of the CPU 108 and include one or more clock circuits, power supplies, cache, input/output circuits, and the like. The memory 112 comprises at least one of Read Only Memory (ROM), Random Access Memory (RAM), disk drive storage, optical storage, removable storage and/or the like. The memory 112 includes various software packages, such as an agent 114. Furthermore, the agent 114 includes a monitor 116 as a subcomponent.

According to one or more embodiments, the node 104 provides one or more application services to an end user (e.g., a client computer) that depends upon various computing resources. For example, an application service may be a database service, which depends on one or more computer resources, such as network resources (e.g., Virtual IP addresses, network interface cards (NIC) and/or the like), storage resources (e.g., physical disks, magnetic tape drives and/or the like), software resources (e.g., operating system processes, application processes and/or the like), file system resources (e.g., mounted volumes, network shared partitions and/or the like) and/or the like. During ordinary cluster operations, a failure may occur at the one or more computer resources at the node 104. For example, one or more hard disks at the node 104 may be operating poorly due to various failures, malfunctions and/or errors and therefore, may affect the performance of the application.

The network 106 comprises a communication system that connects computers by wire, cable, fiber optic and/or wireless link facilitated by various types of well-known network elements, such as hubs, switches, routers, and the like. The network 106 may employ various well-known protocols to communicate information amongst the network resources. For example, the network 106 may be a part of the internet or intranet using various communications infrastructure such as Ethernet, WiFi, WiMax, General Packet Radio Service (GPRS), and the like.

In one embodiment, the agent 114 provides an interface to the clustering software 124 for monitoring and/or controlling access to the computer resources. The agent 114 may be a replication resource agent, an application resource agent, a database resource agent and/or the like. For example, the clustering software 124 deploys a replication agent to the node 104 in order to monitor and/or control access to the replication resources. According to one embodiment, the agent 114 monitors event logs and/or performance counters and accesses the event information and/or the performance data. In another embodiment, the agent 114 uses the monitor 116 to access the event logs and/or the performance counters and extract the event information and/or the performance data associated with one or more applications (i.e., clustered) running on the node 104.

According to one or more embodiments, the clustering software 124 includes software code for providing high availability to the one or more applications running on the node 104. Generally, the clustering software 124 monitors and/or controls a status of various computers, such as, the server 102, the node 104 as well as one or more additional nodes within the cluster. In one embodiment, the clustering software 124 monitors the online and/or offline status of the computer resources. Accordingly, the clustering software 124 controls the computer resources. For example, if a system resource is not online, the clustering software 124 brings the computer resource online for the application.

According to one or more embodiments, the dynamic priority list information 126 includes one or more dynamic priority lists for selecting a target node for operating an application based on the application health data. For example, the application is failed over to the target node. Each dynamic priority list within the dynamic priority list information 126 may be used to identify one or more target nodes for operating the application. As explained further below, a dynamic priority list from the dynamic priority list information 126 may be selected based on the event information and/or the performance data. In other words, the dynamic priority list information 126 includes a dynamic priority list that corresponds with a particular event. In one embodiment, the clustering software 124 selects a dynamic priority list of the from the dynamic priority list information 126 that corresponds a failure, such as a Fiber Switch Down event.

Generally, the application provides the event information and/or the performance data through event logs and/or performance counters, respectively. The event information includes logged events that indicate application health. The event information may indicate a failure of node resources. Additionally, the event information may indicate non-availability of computer resources for the application. The performance data includes performance counter values that indicate application health. The performance data may indicate one or more poorly functioning computer resources. The application health data 117 includes the event information in form of error messages, warning messages and/or the like.

The clustering software 124 may notify the administrator to perform a necessary action that optimizes the application performance in the clustering computing environment. The administrator may be alerted through a user interface for the clustering software 124 or through a notification service. For example, on being notified, the administrator may switchover the application to the other node. Alternatively, the clustering software 124 automatically performs the necessary action depending on the extracted information, and thus optimizes the application performance in the clustering computing environment.

In one embodiment, the application health data 117 indicates states of various computing resources associated with the node 104. In one embodiment, the monitor 116 accesses performance data and/or event information to determine the application health data 117 as explained further below. Furthermore, the monitor 116 examines the application health data 117 to identify an application to migrate to a target node. Accordingly, the monitor 116 communicates the application health data 117 to the clustering software 124. As such, the clustering software 124 may failover or migrate the application to a target node of the one or more target to ensure high availability of the application in accordance with the dynamic priority list information 126 as explained further below.

Figure 2:
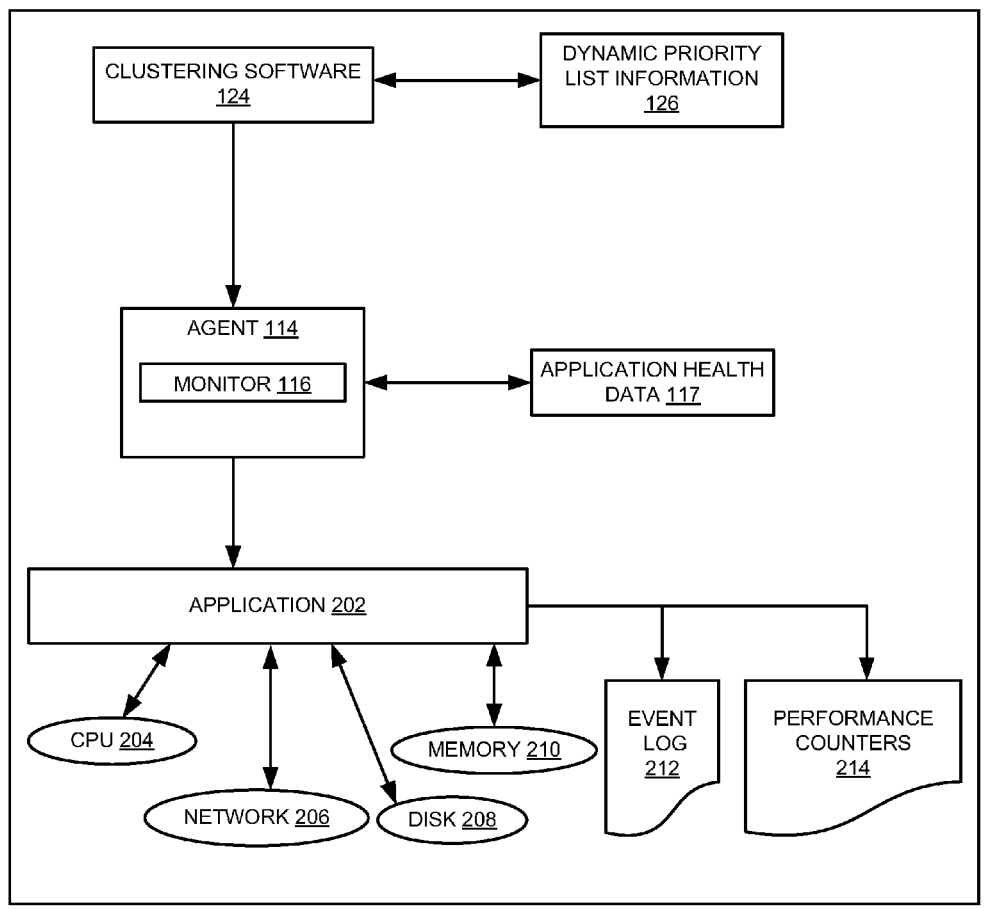
FIG. 2 is a functional block diagram of a proactive monitoring system for examining application health data to improve application performance within a cluster according to one or more embodiments.

FIG. 2 is a functional block diagram of a proactive monitoring system 200 for examining application health data 117 to improve application performance within a cluster according to one or more embodiments of the present invention. The proactive monitoring system 200 improves a performance of an application 202 using event information and/or performance data.

Various computing resources are configured to the application 202, such as a Central Processing Unit (CPU) 204, a network 206, a disk 208 and a memory 210. In one embodiment, one or more capacities of the various computing resources are allocated to the application 202. The disk 208 generally includes one or more data storage devices (e.g., hard disk drives, optical drives and/or the like) and storage management software that provides an interface to the one or more data storage devices for the application 202.

According to one or more embodiments, the proactive monitoring system 200 includes the agent 114, the monitor 116 and the clustering software 124. The application 202 depends on the computing resources, such as the CPU 204, the network 206 and/or the like. Additionally, the application 202 utilizes the computing resources for providing application services to an end user. According to one or more embodiments, the application 202 typically logs events that are raised during execution to generate the event log 212. As such, the event information helps in proactively monitoring health of the application 202.

Generally, an application vendor provides information associated with the events of the application 202. For example, a MICROSOFT SQL Server application may raise an event during execution, such as, MSSQLSERVER_823. Using vendor information, this event indicates that an error has occurred in the MS SQL Server. Such errors may be caused by computers resource failures such as, device driver failures, lower layered software and/or the like. Accordingly, the monitor 116 compares the raised event with events that indicate application health to determine the application health data 117. If the monitor 116 determines that the raised event indicates poor application health, then the application 202 is to be migrated to a target node. In one embodiment, the clustering software 124 selects the target from one or more target nodes in accordance with the dynamic priority list information 126 as explained further below.

According to various embodiments, performance data is stored in the performance counters 214. Additionally, the application vendor provides threshold values of the performance counters. For example, a threshold value for MICROSOFT EXCHANGE 2003 performance counter "MSExchangeIS\Exchmem: Number of heaps with memory errors" is zero. Such a performance counter indicates the total number of Exchmem heaps that failed allocations is due to insufficient available memory. In one embodiment, the monitor 116 accesses current performance data values regarding various computer resources, such as, the CPU 204, the network 206, the disk 208, the memory 210 and/or the like, stored in the performance counters 214. For example, the monitor 116 compares the current performance data values with the threshold values to determine the application health data 117. If the monitor 116 determines that one or more current performance data values deviate from the threshold values, the application 202 is to be migrated to another node (i.e., redundant system) in order to ensure optimal application performance.

According to one or more embodiments, the monitor 116 identifies optimal application capacities for various computing resources using the performance data 214. For example, the proactive monitoring system 200 operates a MICROSOFT EXCHANGE application in which the monitor 116 accesses one or more performance counters "Processor\% Processor Time" and "System\Processor Queue Length". Based on such performance counters, the monitor 116 determines processor utilization data for the CPU 204. Furthermore, the monitor 116 accesses one or more additional performance counters, such as "Process(STORE)\% Processor Time", "Process(inetinfo)\% Processor Time", "Process(EMSMTA)\% Processor Time", to compute processor utilization data for the MICROSOFT EXCHANGE application.

Accordingly, in response to the application health data 117, the clustering software 124 may notify the administrator to take a corrective action. Optionally, the clustering software 124 automatically perform the corrective action and thereby optimizes the application performance ensures high availability in the computer cluster environment. The clustering software 124 may identify one or more target nodes for operating the application in accordance with the dynamic priority list information 126. In one embodiment, the clustering software 124 selects a dynamic priority list that corresponds with a particular event within the event log 212. The clustering software 124 selects a target node of the one or more target nodes having a highest priority. Then, the clustering software 124 migrates the application 202 to the target node.

Figure 3:
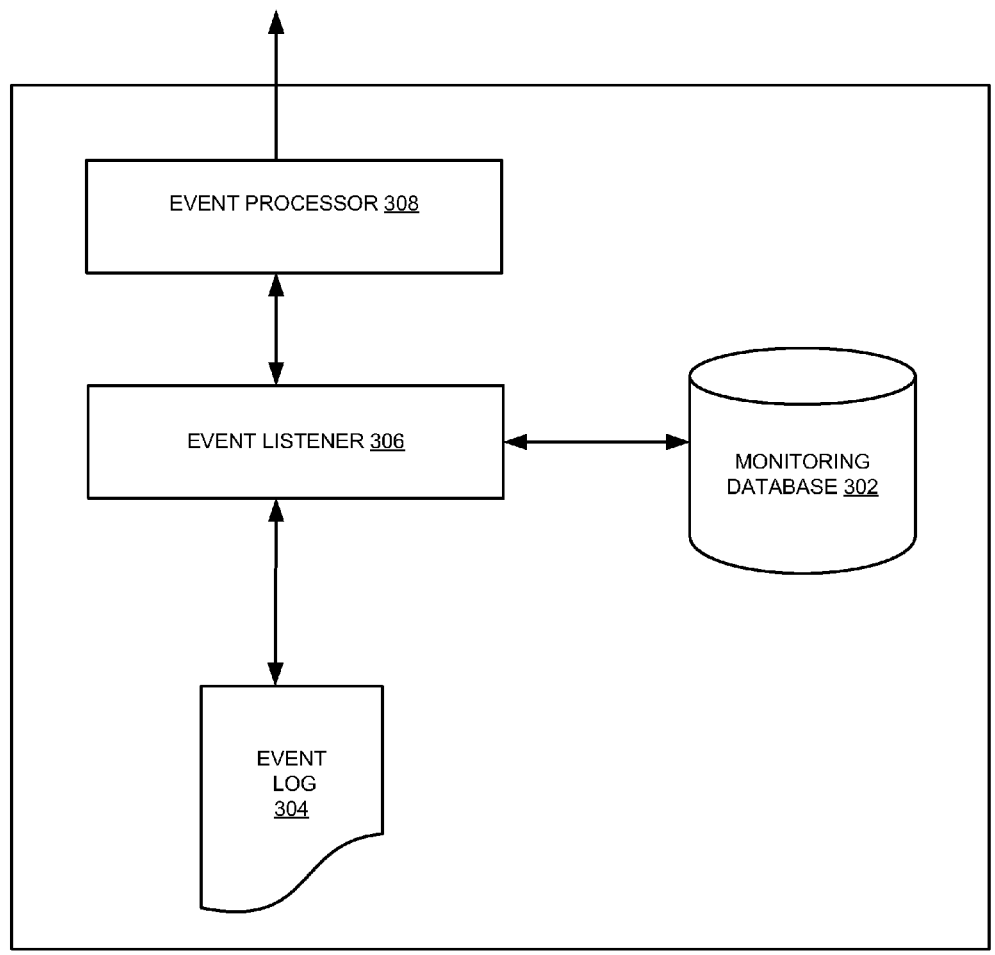
FIG. 3 is a functional block diagram of an event-based monitoring system for processing event information to improve application performance within a cluster according to one or more embodiments.

FIG. 3 is a functional block diagram of an event-based monitoring system 300 for processing event information to improve application performance within a cluster according to one or more embodiments. The event-based monitoring system 300 includes a monitoring database 302, an event log 304, an event listener 306, and an event processor 308. In one embodiment, the monitoring database 302, the event listener 306 and the event processor 308 form a monitor (e.g., the monitor 116 of FIG. 1) that is a subcomponent of an agent (e.g., the agent 114 of FIG. 1).

According to one or more embodiments, the monitoring database 302 defines one or more events that indicate application health. In one embodiment, the monitoring database 302 includes one or more warnings, failures and/or errors, which may be exposed during execution of such of an application (e.g., the application 202 of FIG. 2). The one or more events may indicate non-availability of required computing resources. For example, the application, such as MICROSOFT SQL Server, may raise a "The server is out of memory" event because of non-availability of one or more required memory resources. For example, the monitoring database 302 may includes one or more statically analyzed events. Additionally, the one or more statically analyzed events may be stored in one or more files in an Extensible Markup Language (XML) format. In one embodiment, the one or more files are editable. For example, an administrator may add a new event for proactively monitoring application health to the monitoring database 302.

According to one or more embodiments, the application logs events raised during execution to the event log 304. Generally, the logged events may be warnings, errors, failures and/or the like. Every time the application logs an event in the event log 304, the event listener 306 accesses and analyzes the logged event.

In one embodiment, the event listener 306 compares the logged event with the events defined in the monitoring database 302 to determine application health data. If the logged event matches an event that indicates application health, the event listen 306 caches the logged event as application health data. For example, the cached event may indicate that the application is starving for computer resources and therefore, performing poorly. In other words, the application is unable to utilize a required and/or minimal amount of a particular computer resource.

In one embodiment, the event processor 308 examines one or more cached events after a monitoring cycle (e.g., a user-defined time period) in a chronological order. As such, the one or more cached events reflect various states of computer resources. For example, the cached events may indicate one or more device driver errors at a particular node that are disrupting performance of a SQL Server application. Hence, the SQL Server application is starving for computer resources (e.g., CPU/memory resources). For instance, if a required load of a particular computer resource exceeds an available capacity due to various errors (e.g., device driver errors, lower subsystem errors, operating system errors and/or the like), the SQL Server application may still be alive but cannot function properly.

In one embodiment, the event processor 308 examines the one or more cached events to identify an application to migrate to a target node. For example, one or more target nodes may be redundant systems configured to a SQL Server application service group. Accordingly, the one or more target nodes may or may not be suitable for operating the SQL server application. In one embodiment, clustering software selects the target node of the one or more target nodes in accordance with a dynamic priority list based on the one or more cached events as explained far below. For example, some of the one or more target nodes may be susceptible to the one or more device driver errors and are not to be selected as the target node for operating the SQL Server Application.

In one embodiment, the event processor 308 may determine that the one or more device driver errors reflect poor application health. The SQL Server application service group is not able to function despite being alive and thus, is to be migrated to the target node of the one or more target nodes in order to improve application health. After the migration, the SQL application service group will most likely operate properly. Alternatively, the event processor determines that one or more low-priority application service groups are to be migrated to the target node in order to increase available capacities of various computer resources.

According to one embodiment, the event processor 308 communicates the cached events in order to notify an administrator of the one or more device driver errors. Such a notification may instigate the administrator to perform a corrective measure. In one embodiment, the event processor 308 communicates the cached events to clustering software (e.g., the clustering software 124 of FIG. 1). The clustering software notifies the administrator and/or performs the corrective measure against the raised events. For example, the clustering software may migrate the application to another node (i.e., a target node). As another example, the clustering software may failover the application to the another node in response to a particular cached event (e.g., a storage device failure).

Figure 4:
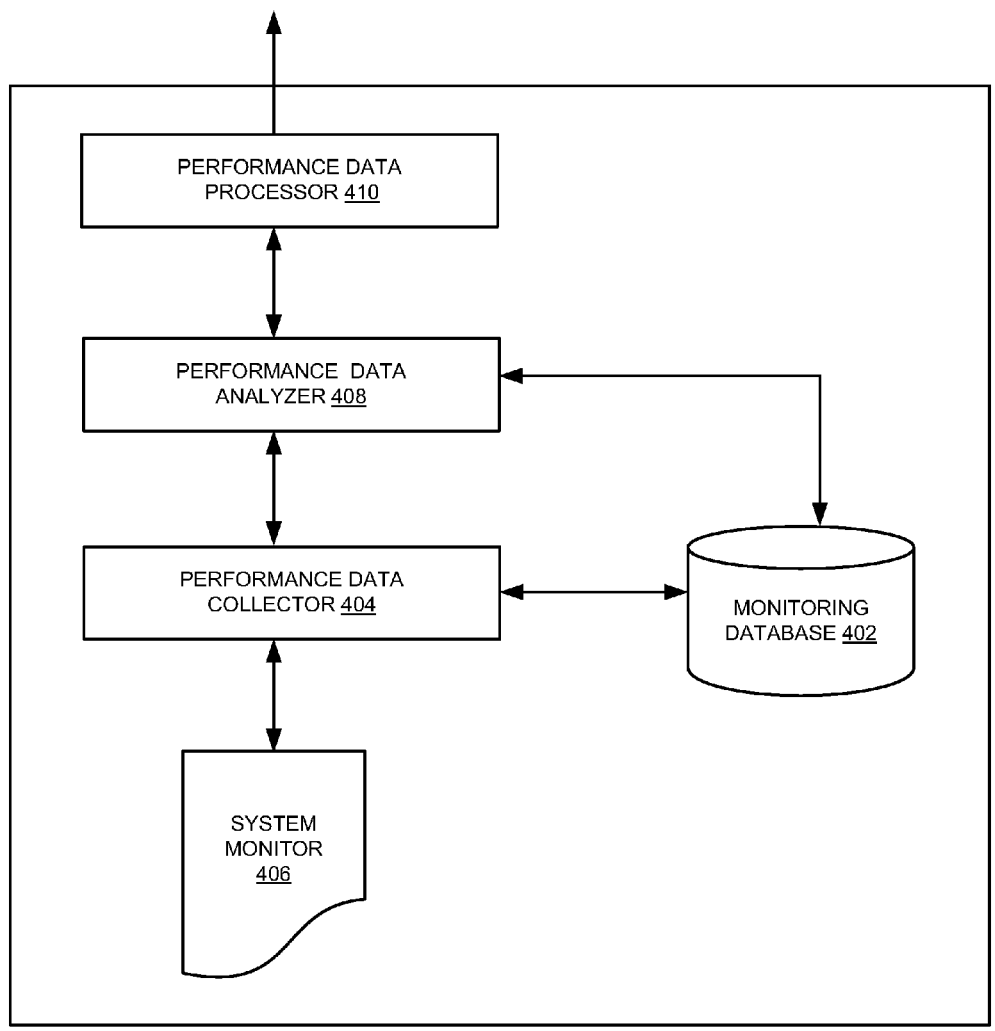
FIG. 4 is a functional block diagram of performance-based monitoring system for processing performance data to improve application performance within a cluster according to one or more embodiments.

FIG. 4 is a functional block diagram of a performance-based monitoring system 400 for processing performance data to improve application performance within a cluster according to one or more embodiments. The performance based monitoring system 400 includes a monitoring database 402, a performance data collector 404, a system monitor 406, a performance data analyzer 408 and a performance data processor 410. In one embodiment, the monitoring database 402, the performance data collector 404, the performance data analyzer 408 and the performance data processor 410 form a monitor (e.g., the monitor 116 of FIG. 1) that is a subcomponent of an agent (e.g., the agent 114 of FIG. 1).

According to one or more embodiments, the monitoring database 402 defines one or more performance counters that indicate application health. In one embodiment, the monitoring database 402 includes pre-defined threshold values for the one or more performance counters. Additionally, the monitoring database 402 stores the performance counters as one or more files in an Extensible Markup Language (XML) format. Furthermore, an administrator may edit the threshold values associated with the one or more performance counters. The administrator may add a performance counter to the monitoring database 402. The administrator may also remove a performance counter from the monitoring database 402.

The performance data collector 404 accesses the one or more performance counters specified in the monitoring database 402 at user-defined intervals. Generally, at an end of each interval, the performance data collector 404 caches current values of the one or more performance counters using the system monitor 406. Subsequently, the performance data analyzer 408 accesses the cached current values of the one or more performance counters and determines one or more mean values, which are compared with the pre-defined threshold values to determine application health data. The performance data analyzer 408 stores the application health data in a cache. As described herein, the application health data may indicate that the application is starving for computer resources and performing poorly. In one embodiment, the administrator defines a time interval for determining the application health data. In another embodiment, the performance data analyzer 404 determines the application health data in response to a health check request from clustering software.

For example, the performance data analyzer 408 compares the cached current values with user-defined threshold values to generate a comparison result. One or more computer resource bottlenecks may be identified based on the comparison result. In one embodiment, the performance data analyzer 408 logs the one or more computer resource bottlenecks to the comparison result. Then, the performance data analyzer 408 stores the comparison result in a cache as application health data. For example, a threshold value for MICROSOFT EXCHANGE performance counter "Memory\Page Reads/sec" may be defined as equal to or less than one hundred reads per second. Accordingly, the performance data analyzer 408 compares the "Memory\Page Reads/sec" performance counter value with the threshold value to detect a memory resource bottleneck, which indicates that MICROSOFT Exchange is starving for memory resources.

In one embodiment, the performance data processor 410 examines one or more cached computer resource bottlenecks (i.e., application health data) after a monitoring cycle (e.g., a user-defined time period) in a chronological order. As such, the cached computer resource bottlenecks reflect various states of computer resources. For example, the cached computer resource bottlenecks may indicate a performance counter that is below a pre-defined threshold. Computer resources associated with the performance counter are causing a MICROSOFT Exchange application to operate poorly. Hence, the MICROSOFT Exchange application is starving for the computer resources (e.g., CPU/memory resources). For instance, if a required load of a particular computer resource exceeds an available capacity as indicated by the performance counter, the MICROSOFT Exchange application may not perform adequately.

In one embodiment, the performance data processor 410 examines the cached computer resource bottlenecks to identify an application to migrate to one or more target nodes. For example, the one or more target nodes may be redundant systems configured to a MICROSOFT Exchange application service group. Accordingly, the one or more target nodes may or may not be suitable for operating the MICROSOFT Exchange application. In one embodiment, clustering software selects a target node of the one or more target nodes based on the cached computer resource bottlenecks in accordance with a dynamic priority list as explained further below. For example, some of the one or more target nodes may have current performance data values that are below pre-defined threshold values and are not to be selected as the target node for operating the MICROSOFT Exchange application.

In one embodiment, the performance data processor 410 may determine that the one or more performance counter reflect poor application health and thus, the MICROSOFT Exchange application service group is to be migrated to the target node of the one or more target nodes in order to improve application health. Alternatively, the performance data processor 410 determines that one or more low-priority application service groups are to be migrated to the target node in order to increase available capacities of various computer resources for the MICROSOFT Exchange application service group.

According to one embodiment, the performance data processor 410 communicates the application health data in order to notify an administrator as to poor application health. Such a notification may instigate the administrator to perform a corrective measure. In one embodiment, the event processor 308 communicates the application health data to clustering software (e.g., the clustering software 124 of FIG. 1). The clustering software notifies the administrator and/or performs the corrective measure. For example, the clustering software may migrate the application to another node (i.e., a target node). As another example, the clustering software may failover the application to the another node in response to a failure.

Figure 5:
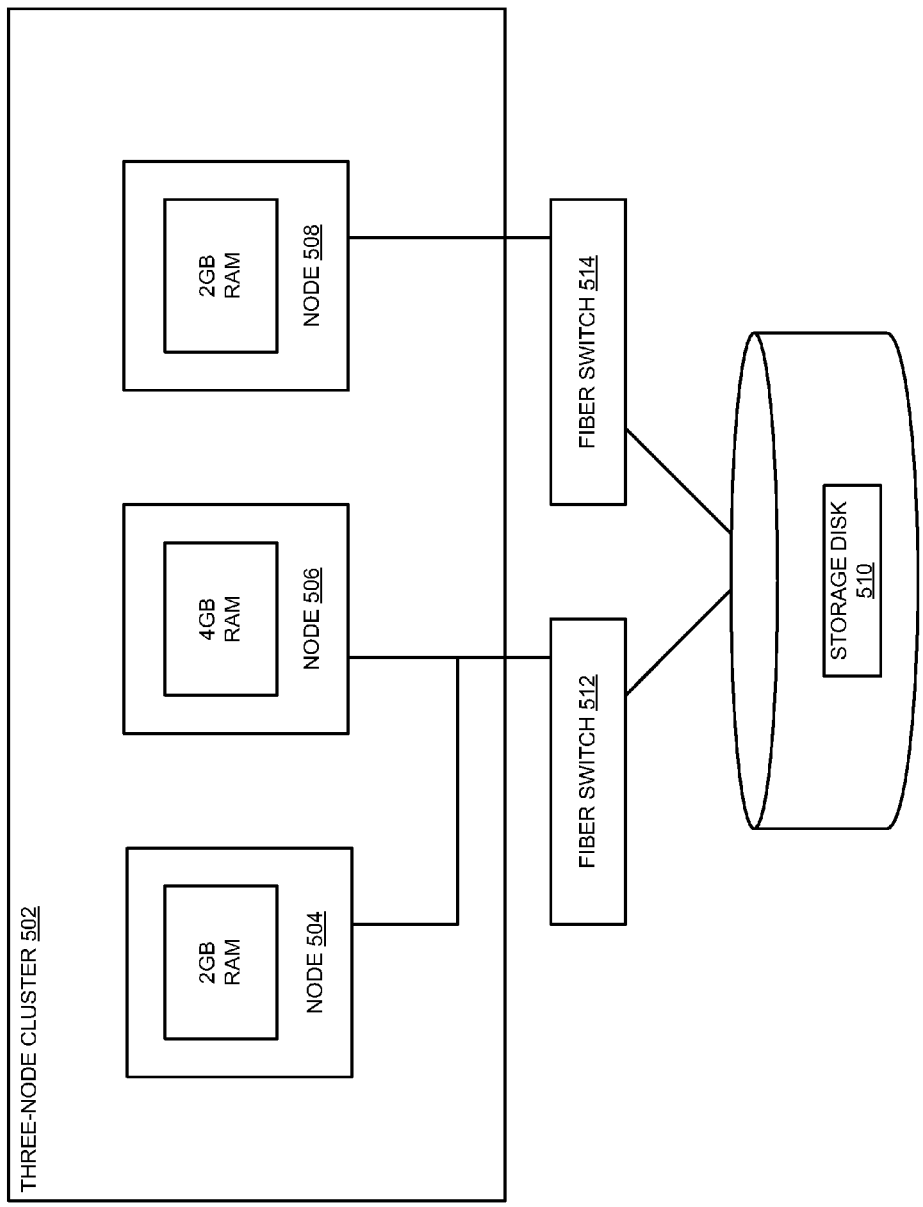
FIG. 5 is a functional block diagram of a cluster architecture for processing application health data to improve application performance within a three-node cluster in accordance with dynamic priority list information according to one or more embodiments.

FIG. 5 is a functional block diagram that illustrates cluster architecture 500 for processing application health data to improve application performance within a three-node cluster in accordance with dynamic priority list information according to one or more embodiments. The cluster architecture 500 provides nodes (i.e., redundant systems) for operating an application service group. As an example and not as limitation, the cluster architecture 500 comprises a three-node cluster 502 that includes a node 504, a node 506 and a node 508. Each node of the three-node cluster 502 is coupled to a storage disk 510 through fiber switches 512 and/or a fiber switch 514.

Generally, the three-node cluster 502 employs clustering software for operating application service groups and controlling access to various computer resources. Each node of the three-node cluster 502 is a type of computing device (e.g., a laptop, a desktop, a Personal Digital Assistant (PDA) and/or the like), such as those generally known in the art. Each node of the computer cluster 502 includes one or more computer resources (e.g., memory resources) for operating the application service group. For example, the node 504 and the node 508 include two GB of Read Only Memory (RAM) each whereas, the node 506 includes four GB of RAM.

Generally, the storage disk 510 generally includes one or more data storage devices (e.g., hard disk drives, optical drives, magnetic tape drives and/or the like). Generally, fiber switches, such as the fiber switch 512 and the fiber switch 514, provides communication paths between the three-node cluster 502 and the storage disk 510. The node 504 and the node 506 are coupled to the storage disk 510 through the fiber switch 512. Furthermore, the node 508 is coupled to the storage disk 510 using the fiber switch 514.

Generally, the application service group comprises of various computing resources, such as, the hardware resources and/or software resources operating together for providing services to the user. Additionally, the application service group is executed on an active node (e.g., the node 504). For example, in response to a failure and/or non-availability of computing resources on the active node, the application service group is failed over from the active node to the target node to achieve high availability. In one embodiment, the target node may have a highest priority amongst one or more target nodes (e.g., redundant systems for the application service group). As such, clustering software migrates or fails over the application service group to a target node having highest priority amongst the one or more target nodes.

In one embodiment, the node 504 is the active node for operating the application service group. During execution, the application service group running on the node 504 determines non-availability of one or more computing resources through event logs and/or performance counters. For example, the application service group using may require four GB of RAM to operate. As such, target nodes having at least four GB of RAM have higher priorities than target nodes that have less than four GB of RAM. Accordingly, the node 506 has a highest priority in the three-node cluster 502. Consequently, the application service group is switched or failed over to the node 506 instead of the node 508.

Based on application health data associated with the application service group, the application is migrated from the active node to a target node to improve workload management in accordance with one or more dynamic priority lists. Such dynamic priority lists may be associated with one or more events. For example, a certain dynamic priority list may indicate that the application is to failover to the Node 506 and then, the Node 508 if there is an error associated with memory resources. However, another dynamic priority list indicates that the application is to failover to the Node 508 before the Node 506 if there is a particular error associated with the fiber switches, such as a Fiber Switch Down event. Hence, if the Fiber Switch Down event occurs, then the another dynamic priority list is selected instead of the certain dynamic priority list and the node 508 is selected as the target node.

According to one or more embodiments, the fiber switch 512 may be operating poorly and affecting communications between the node 504 and the storage disk 510. Accordingly, communications between the node 506 and the storage disk 510 are also affected because the node 504 and the node 506 share the fiber switch 512. Since the node 508 employs the fiber switch 514, a failure associated with the fiber switch 512, such as a Fiber Switch Down event, does not affect communications between the node 508 and the storage disk 510. As such, a dynamic list that corresponds with the failure associated with the fiber switch 512 is selected. Such a dynamic list indicates that the node 508 has a highest priority within the three-node cluster 502 instead of the node 506. Hence, the node 508 is selected as the target node by clustering software in order to ensure that a particular application is operating properly.

Figure 6:
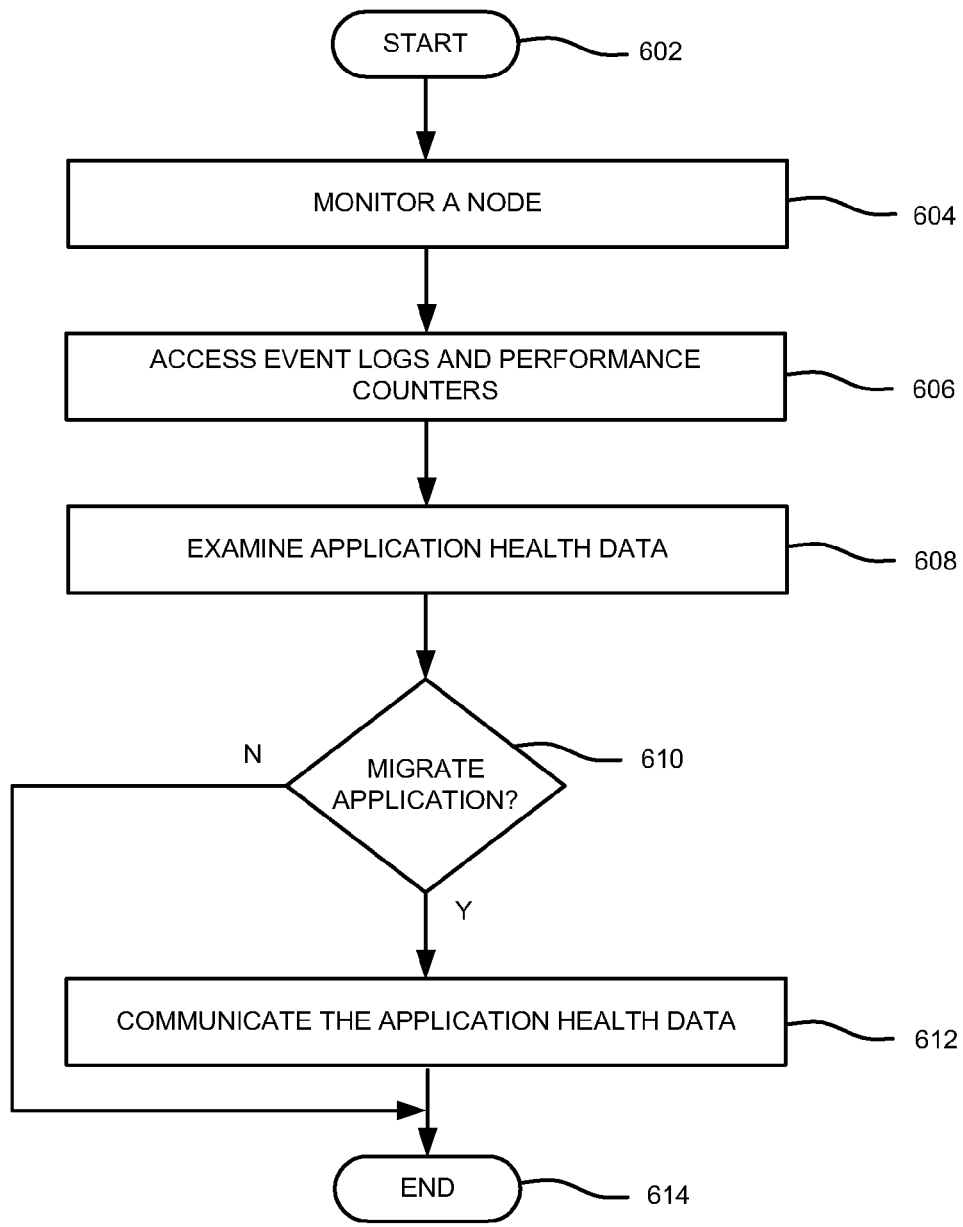
FIG. 6 is a flow diagram of a method for processing application health data to improve application performance within a cluster according to one or more embodiments.

FIG. 6 is a flow diagram of a method 600 for processing application health data to improve application performance within a cluster according to one or more embodiments. The method 600 starts at step 602 and proceeds to step 604, at which a node (e.g., the node 104 of the FIG. 1) is monitored.

At step 606, an event log (e.g., the event log 212 of the FIG. 2) and performance counters (e.g., the performance counters 214 of the FIG. 2) are accessed. At step 608, application health data (e.g., application health data 117 of the FIG. 1) is examined. In an embodiment, the application health data is determined from the events raised by the application and/or performance counters values of the application and/or the computing resources.

At step 610, a determination is made as to whether the application is to be migrated. If it is determined that the application is to be migrated (option "YES"), the method 600 proceeds to step 612. If at step 610, it is determined that the application is not to be migrated (option "NO"), then the method 600 proceeds to step 612. At step 612, the application health data is communicated to clustering software (e.g., the clustering software 124 of FIG. 1). As described above, the clustering software may perform various operations using the application health data.

In one embodiment, the clustering software displays the application health data to a system administrator and/or sends a notification (e.g., an email) that includes a corrective measure (e.g., migrate the application). In another embodiment, the clustering software selects a target node based on the application health data in accordance with dynamic priority list information (e.g., the dynamic priority list information of FIG. 1). Once the target node is selected, the clustering software stops the application running on an active node. Then, the application is restarted on the target node. After the step 612, the method 600 proceeds to step 614, at which the method 600 ends.

While the foregoing is directed to embodiments of the present invention, other and further embodiments of the invention may be devised without departing from the basic scope thereof, and the scope thereof is determined by the claims that follow.

The invention claimed is:

1. A method for processing application health data to improve application performance within a cluster, comprising:
    accessing at least one of performance data or event information associated with at least one application to determine application health data;
    examining the application health data to identify an application of the at least one application to migrate, wherein examining the application health data further comprises:
        identifying at least one target node for operating the application of the at least one application based on the application health data in accordance with dynamic priority list information, and
        selecting, using clustering information, a dynamic priority list from the dynamic priority list information that corresponds with a particular event within the event information, wherein the clustering information comprises instructions configured to provide availability to applications operating on the at least one target node; and
    failing over the application of the at least one application to a target node of the at least one target node in response to a failure.

2. The method of claim 1, wherein accessing the at least one of performance data or event information further comprises monitoring event logs to process the event information.

3. The method of claim 1, wherein accessing the at least one of performance data or event information further comprises monitoring performance counters to process the performance data.

4. The method of claim 1, wherein examining the application health data further comprises selecting a target node of the at least one target node based on the event information.

5. The method of claim 1, wherein examining the application health data further comprises selecting a target node of the at least one target node based on the performance data.

6. The method of claim 1, further comprising migrating the application of the at least one application to a target node of the at least one target node.

7. The method of claim 1, wherein accessing the at least one of performance data or event information further comprises comparing at least one performance counter value with at least one pre-defined threshold value to generate a comparison result.

8. An apparatus for processing application health data to improve application performance within a cluster, comprising:
    at least one node, the at least one node comprising:
        a monitor for accessing at least one of performance data or event information associated with at least one application to determine application health data and examining the application health data to identify an application of the at least one application to migrate; and
        clustering software for identifying at least one target node for operating the application of the at least one application based on the application health data in accordance with dynamic priority list information and for selecting a target node of the at least one target node based on the at least one of the event information or the performance data, wherein the clustering software comprises instructions configured to provide availability to applications operating on the at least one target node, and fails over the application to a target node of the at least one target node in response to a failure.

9. The apparatus of claim 8, wherein the monitor is a component of an agent for monitoring at least one of event logs to process the event information or performance counters to process the performance data.

10. The apparatus of claim 8, further comprising clustering software for selecting a dynamic priority list from the dynamic priority list information that corresponds with a particular event within the event information.

11. The apparatus of claim 8, further comprising clustering software for migrating the application of the at least one application to a target node of the at least one target node based on the application health data.

12. The apparatus of claim 8, wherein the monitor compares at least one performance counter value with at least one pre-defined threshold value to generate a comparison result.

13. A system for processing application health data to improve application performance within a cluster, comprising:
    a node comprising:
        an agent for monitoring at least one of performance counters or event logs associated with at least one application to process at least one of performance data or event information and
        a monitor for accessing at least one of performance data or event information associated with at least one application to determine application health data and examining the application health data to identify an application of the at least one application to migrate, wherein the monitor is a component of the agent; and
    a server coupled to the node, comprising:
        clustering software for migrating the application of the at least one application to a target node in accordance with dynamic priority list information, wherein the clustering software comprises instructions configured to provide availability to applications operating on the node and selects a dynamic priority list from the dynamic priority list information that corresponds with a particular event within the event information.

* * * * *

UNITED STATES PATENT AND TRADEMARK OFFICE
CERTIFICATE OF CORRECTION

| | | |
|---|---|---|
| PATENT NO. | : 8,117,487 B1 | Page 1 of 1 |
| APPLICATION NO. | : 12/345202 | |
| DATED | : February 14, 2012 | |
| INVENTOR(S) | : Raut et al. | |

It is certified that error appears in the above-identified patent and that said Letters Patent is hereby corrected as shown below:

Title page Item (75) inventor's name "Mehendra Dilip Karmuse" should be read -- Mahendra Dilip Karmuse --.

Signed and Sealed this
Eighth Day of May, 2012

David J. Kappos
*Director of the United States Patent and Trademark Office*